(12) United States Patent  
Gagnon et al.

(10) Patent No.: US 8,807,299 B2
(45) Date of Patent: Aug. 19, 2014

(54) POSITION SENSITIVE SHOCK ABSORBER

(75) Inventors: Pascal Gagnon, Valcourt (CA); Sebastien Thibault, Sherbrooke (CA)

(73) Assignee: Bombardier Recreational Products Inc., Valcourt, Quebec ( * ) Notice: Subject to any disclaimer, the term of this patent is extended or adjusted under 35 U.S.C. 154(b) by 577 days.

(21) Appl. No.: 12/239,201

(22) Filed: Sep. 26, 2008

(65) Prior Publication Data

US 2009/0078518 A1   Mar. 26, 2009

Related U.S. Application Data

(60) Provisional application No. 60/975,395, filed on Sep. 26, 2007.

(51) Int. Cl.
*F16F 9/48* (2006.01)
(52) U.S. Cl.
USPC ................................. 188/284; 267/226
(58) Field of Classification Search
USPC .............. 188/266, 284, 322.15, 322.22, 316; 267/226
See application file for complete search history.

(56) References Cited

U.S. PATENT DOCUMENTS

| | | | | |
|---|---|---|---|---|
| 1,794,807 A | * | 3/1931 | Thompson | 188/288 |
| 2,599,477 A | | 6/1952 | Patriquin | |
| 2,729,308 A | | 1/1956 | Koski et al. | |
| 3,111,201 A | * | 11/1963 | Bliven et al. | 188/289 |
| 3,134,460 A | | 5/1964 | De Carbon | |
| 3,147,826 A | | 9/1964 | McHenry | |
| 3,656,632 A | | 4/1972 | Karakashian et al. | |
| 3,784,179 A | | 1/1974 | Sugiura | |
| 3,888,436 A | | 6/1975 | Sealey | |
| 4,004,662 A | | 1/1977 | Sorgatz et al. | |
| 4,106,596 A | | 8/1978 | Hausmann | |
| 4,274,515 A | * | 6/1981 | Bourcier de Carbon | 188/269 |
| 4,588,053 A | | 5/1986 | Foster | |
| 4,768,629 A | * | 9/1988 | Wossner | 188/284 |
| 5,102,109 A | * | 4/1992 | Schnetz | 267/226 |
| 5,178,239 A | | 1/1993 | Homme | |
| 5,219,414 A | | 6/1993 | Yamaoka | |
| 5,560,456 A | | 10/1996 | Koch et al. | |
| 5,810,130 A | * | 9/1998 | McCandless | 188/322.22 |

(Continued)

FOREIGN PATENT DOCUMENTS

| | | |
|---|---|---|
| EP | 0806587 A1 | 11/1997 |
| EP | 1050696 A2 | 11/2000 |

(Continued)

OTHER PUBLICATIONS

English Abstract of European Publication No. EP0806587, Published on Nov. 12, 1997.

(Continued)

*Primary Examiner* — Bradley King
*Assistant Examiner* — Stephen Bowes
(74) *Attorney, Agent, or Firm* — BCF LLP

(57) ABSTRACT

A position-sensitive shock absorber is disclosed. The position-sensitive shock absorber includes a choking member positioned within the housing at a specific point along the stroke of the working piston that cooperates with the working piston to increase the resistance to fluid flow when the working piston reaches the specific point along its stroke thereby defining a second damping characteristic of the position-sensitive shock absorber from the specific point along the stroke of the working piston onward.

15 Claims, 14 Drawing Sheets

(56) References Cited

U.S. PATENT DOCUMENTS

| | | |
|---|---|---|
| 5,823,306 A | 10/1998 | De Molina |
| 6,296,092 B1 | 10/2001 | Marking et al. |
| 6,651,787 B2 | 11/2003 | Grundei |
| 6,681,906 B1 | 1/2004 | Sasse |
| 6,776,269 B1 | 8/2004 | Schel |
| 6,814,193 B2 | 11/2004 | Grundei |

FOREIGN PATENT DOCUMENTS

| | | |
|---|---|---|
| EP | 1087153 A1 | 3/2001 |
| EP | 1111266 A2 | 6/2001 |
| EP | 1191251 A2 | 3/2002 |
| GB | 585402 | 2/1947 |
| GB | 763557 | 12/1956 |
| GB | 1489350 | 10/1977 |
| GB | 2104183 A | 3/1983 |
| GB | 2231385 A | 11/1990 |
| GB | 2319321 A | 5/1998 |
| JP | 57037130 A | 3/1982 |
| JP | 06101735 A | 4/1994 |
| JP | 2002168282 A | 6/2002 |
| WO | WO98/02673 A1 | 1/1998 |
| WO | WO2005/036019 A1 | 4/2005 |

OTHER PUBLICATIONS

English Abstract of European Publication No. EP1087153, Published on Mar. 28, 2001.

English Abstract of Japanese Publication No. JP2002168282, Published on Jun. 14, 2002.

English Abstract of Japanese Publication No. JP57037130, Published on Mar. 1, 1982.

English Abstract of Japanese Publication No. JP06101735, Published on Apr. 12, 1994.

* cited by examiner

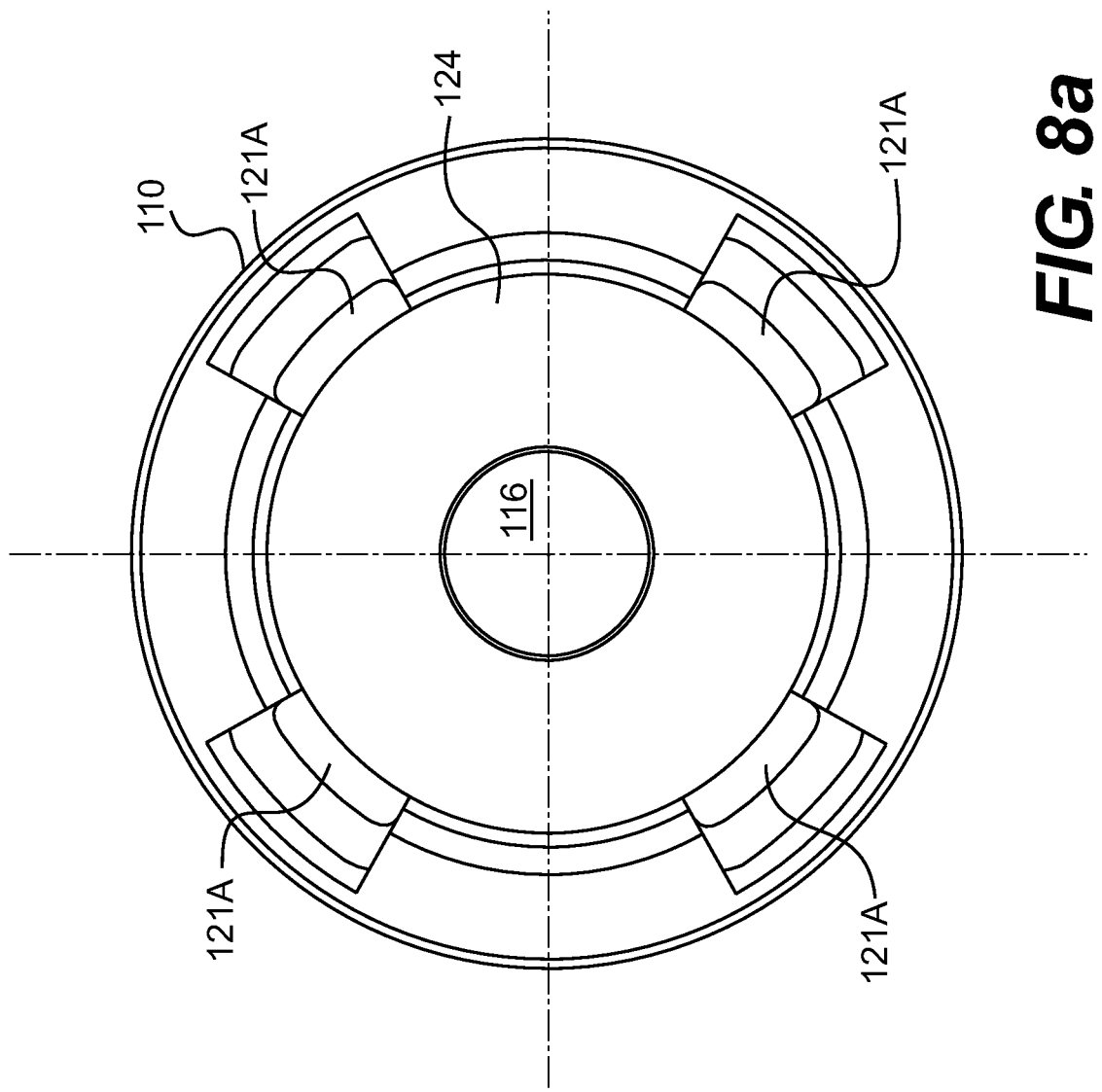

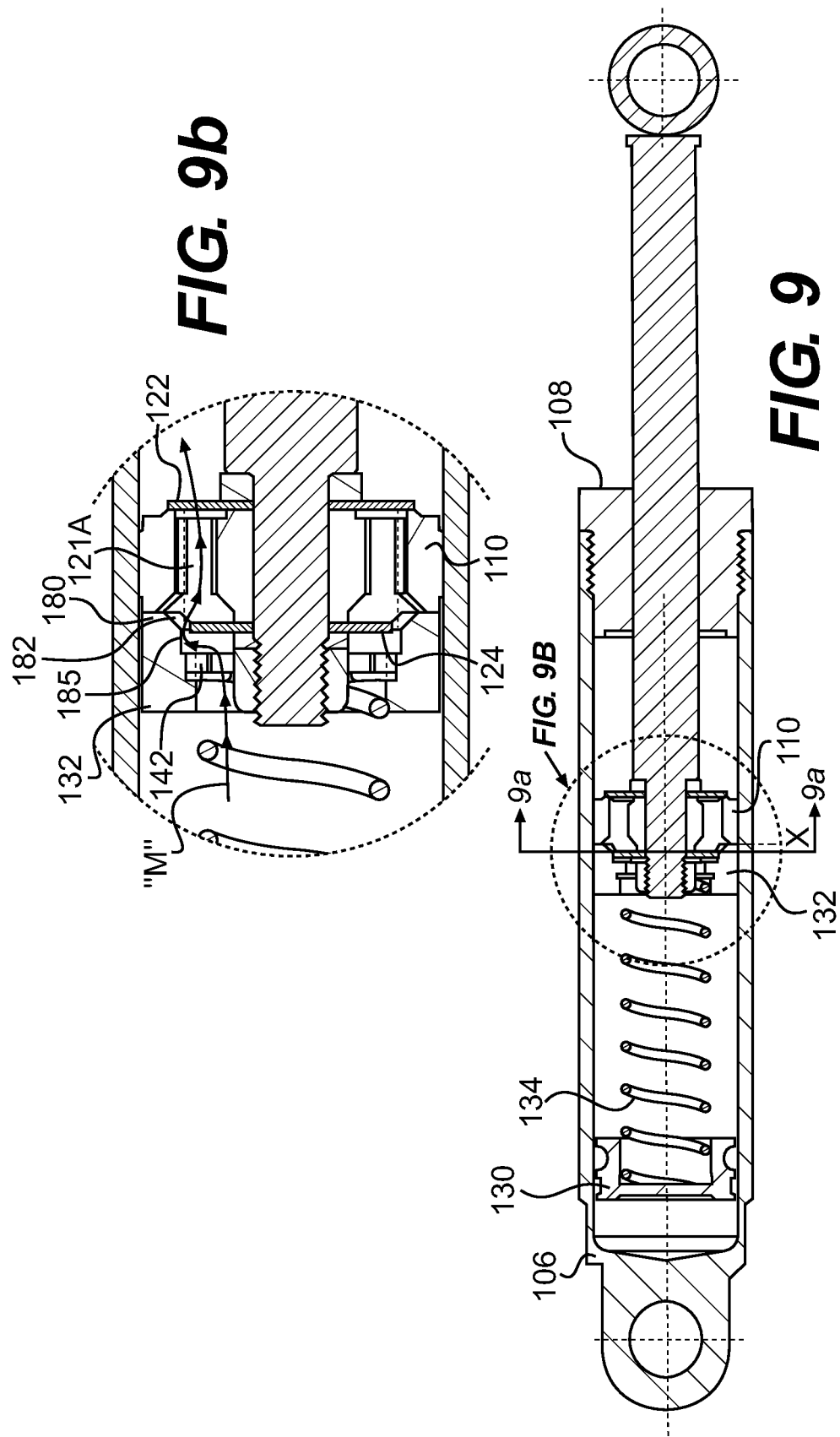

POSITION SENSITIVE SHOCK ABSORBER

CROSS-REFERENCE

The present application claims priority to U.S. Provisional Patent Application No. 60/975,395 filed on Sep. 26, 2007, the entirety of which is incorporated herein by reference.

FIELD OF THE INVENTION

The present invention relates to shock absorbers for use in suspension systems of on-road or off-road vehicles and more particularly to position sensitive shock absorbers for use in suspension systems of such vehicles.

BACKGROUND OF THE INVENTION

Shock absorbers are typically oil-filled cylinders within which a vented piston is mounted. The piston is connected to a shaft which extends out of one end of the cylinder. The outer end of the shaft is mounted to one point on the vehicle and the other end of the cylinder is mounted to another point on the vehicle, sometimes in parallel with a suspension spring.

Typical shock absorbers provide two kinds of damping: compression damping and rebound damping. One refers to damping force created during "inward" travel of the shaft (shortening of the shock), the other refers to force created during "outward" travel of the shaft (lengthening of the shock). Generally, but not always—depending on the linkage connecting the shock absorber to the vehicle, rebound damping occurs during outward motion and compression damping occurs during inward motion.

Piston-type shock absorbers can be designed to provide the same amount of damping on both the compression stroke and the rebound stroke. Alternatively, the fluid passageways through the vented piston can be designed so that the restriction to fluid flow through the vented piston during the compression stroke is different than the restriction to fluid flow during the rebound stroke. In this case the damping during the entire compression stroke is different than the damping during the entire rebound stroke. The fluid passageways through the vented piston are covered by circular plates, or discs which restrict and/or prevent the flow of fluid through the passageways to obtain the necessary compression and rebound characteristics needed for the particular application. For a constant velocity, the resistance provided by the working piston is constant for the entire stroke of the vented piston.

In some applications where the vehicle traverses uneven terrain, it is desirable to have different damping characteristics at different places along the stroke of the piston. For example, at the beginning of the stroke, starting from fully extended, it might be desirable to have very soft damping, thus absorbing impact as much as possible, but near the end of the stroke, it is desirable to have a very hard damping to prevent the shock from bottoming, being fully compressed to the point that there is a metal to metal contact between the moving parts. With many standard shock absorbers, this is not possible since the valving is non-adjustable and only speed sensitive.

Another type of damping is called position-sensitive damping. Position-sensitive damping is typically achieved by the combination of conventional vented piston damping, with the oil flowing through the piston, plus the passage of oil around the piston through a by-pass chamber or channel, which permits oil to by-pass the piston during a portion of the piston stroke. These shock absorbers are known as twin-tube shock absorbers. The by-pass channel thus permits lesser damping over the portion of the stroke during which some fluid flows around the piston through the by-pass channel. Therefore, the shock absorber can have different damping characteristics along different segments of the stroke. A single shock absorber can provide smooth damping for less aggressive riding and firm damping for aggressive riding without making any adjustments during the ride. For example, the shocks can provide reduced damping in the mid-stroke zone, where the shock is most active while trail riding or other less aggressive riding. If the rider starts riding more aggressively, or hits a large bump, causing the shock absorber to compress deeper into the stroke, the piston extends beyond the by-pass passages and again the shock absorber relies on the conventional piston damping. This type of shock absorber has been available for many years. U.S. Pat. No. 5,178,239 and U.S. Pat. No. 6,296,092 illustrate examples of position-sensitive damping action via by-pass channels.

However, position-sensitive shock absorbers using twin tubes to create by-pass channels are bulkier than standard shock absorbers and require an intricate series of by-pass channels linked to the cylinders.

Thus, there is a need for a position-sensitive shock absorber that alleviates some of the drawbacks of prior art position-sensitive shock absorbers.

SUMMARY OF THE INVENTION

It is an object of the present invention to ameliorate at least some of the inconveniences present in the prior art.

It is also an object of the present invention to provide a position-sensitive shock absorber which damping characteristics can be adjusted.

In one aspect, the invention provides a position-sensitive shock absorber comprising a cylinder having an interior, a first end and a second end, together defining a housing; a working piston movably mounted within the housing for movement between the first end and the second end defining the stroke of the working piston; the working piston having a first side and a second side, fluid passageways extending through the working piston and permitting fluid flow between the first side and the second side. The shock absorber includes at least one compression-mode valve and at least one rebound-mode valve covering at least partially the fluid passageways of the working piston and restricting the flow of fluid through the working piston. The fluid passageways, the at least one compression-mode valve and the at least one rebound-mode valve together defining at least in part a first damping characteristic of the shock absorber. A choking member is positioned within the housing, that cooperates with the working piston to further restrict the flow of fluid when the working piston reaches a specific point along the stroke of the working piston thereby defining a second damping characteristic of the shock absorber from the specific point of the stroke of the working piston.

In a further aspect, the position-sensitive shock absorber includes a spring positioned within the housing and adapted to mechanically connect the choking member and the working piston; the spring is adapted to bias the choking member against the working piston when the working piston reaches the specific point along its stroke.

In an additional aspect, the choking member includes a plurality of chokers disposed at intervals between the specific point along the stroke of the working piston and the first end of the cylinder, each choker further restricting the flow of fluid and further modifying the damping characteristic of the shock absorber as the working piston reaches each choker.

In another aspect, the position-sensitive shock absorber comprises a valve and a stationary piston both positioned at the first end of the cylinder, the valve and the stationary piston including passageways permitting fluid flow between the housing and an outer fluid chamber, the choking member engaging the stationary piston when the working piston reaches the specific point along its stroke thereby restricting the flow of fluid through the stationary piston and defining the second damping characteristic of the shock absorber from the specific point along the stroke of the working piston.

In a further aspect, the spring is biasing the choking member against the stationary piston when the working piston reaches the specific point along its stroke.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 8a is cross-sectional view of the position-sensitive shock absorber taken at line 8a-8a in FIG. 8;

FIG. 9 is a cross-sectional view of the position-sensitive shock absorber of FIG. 8 with the working piston in a second location;

FIG. 9b is an enlarged view of the encircled portion of FIG. 9;

FIG. 10b is front left perspective view of the choking member shown in FIG. 10a.

DETAILED DESCRIPTION OF THE PREFERRED EMBODIMENTS

Figure 1:
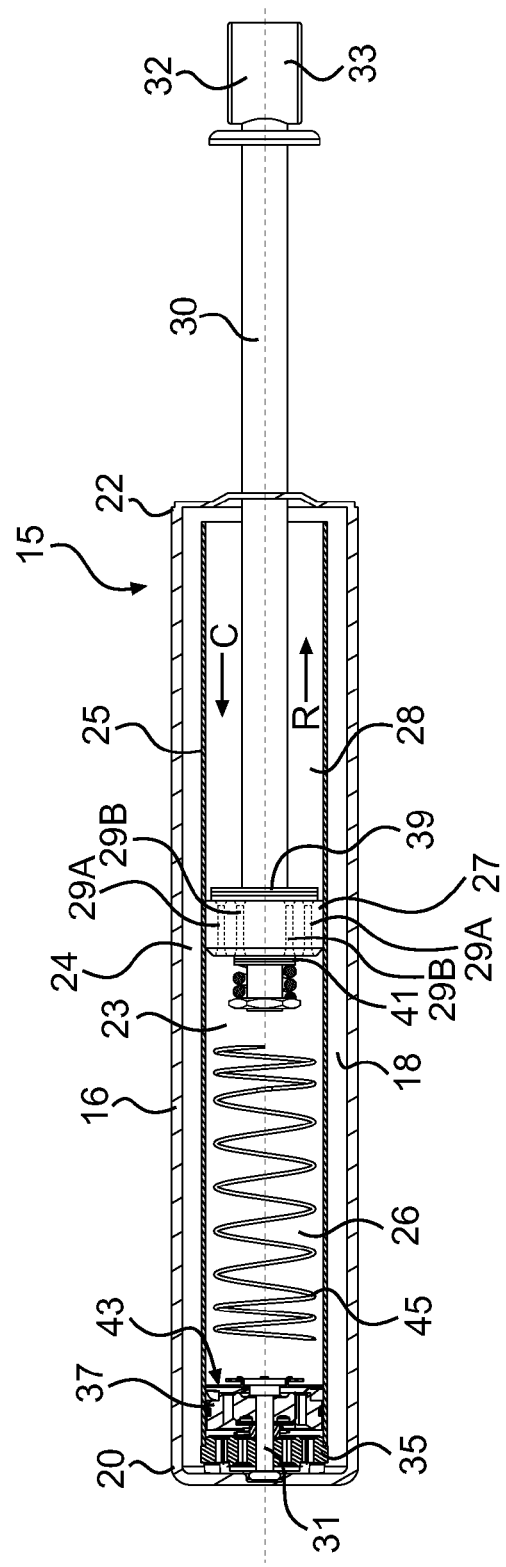
FIG. 1 is a cross-sectional view of a position-sensitive shock absorber in accordance with a first embodiment of the invention with the working piston in a first location.

Referring to FIG. 1, there is shown a position-sensitive shock absorber 15 including a cylinder 16 having an interior 18, and first and second ends 20, 22. The interior 18 of the cylinder 16 is divided into a piston housing 23 and an outer fluid chamber 24 by an inner cylinder 25 coaxial with the cylinder 16. A working piston 27 is movably mounted within the inner cylinder 25 for moving between the first and second ends 20, 22 of the cylinder 16. The working piston 27 divides the inner cylinder 25 into a first chamber 26 and a second chamber 28. The working piston 27 is connected to a working rod 30 extending outside the cylinder 16. The end 32 of the working rod 30 typically includes a fastener 33 adapted for connection to a moving part (not Shown).

The working piston 27 includes several passageways 29 there through to fluidly connect chambers 26 and 28. One or more compression discs 39 are positioned on one side of the working piston 27 and restricts the flow of hydraulic fluid when the working piston 27 is moving inwardly toward the first end 20 and one or more rebound discs 41 are positioned on the other side of the working piston 27 which restricts the flow of hydraulic fluid when the working piston 27 is moving outwardly toward the second end 22. The compression discs 39 and the rebound discs 41 are placed on each side of the piston 27 to provide the necessary resistance to the hydraulic fluid through which the piston 27 travels. The discs 39, 41 consist of circular discs covering the entrance of the passageways 29A and 29B which restrict and/or prevent the hydraulic flow of fluid through the passageways 29A and 29B as is conventionally known in the art of shock absorbers. The compression discs 39 covers the compression passageways 29A which are located along the outer circumference of the working piston 27 and the rebound discs 41 cover the rebound passageways 29B which are located along the central axis of the working piston 27. During the compression phase, when the working piston 27 is being pushed into the inner cylinder 25, the circular plates of the compression discs 39 are pushed away from the openings of the compression passageways 29A by the resistance of the viscosity of the hydraulic fluid applying pressure onto the compression discs 39 thus increasing the force needed for the hydraulic fluid to flow through the passageways 29A while the rebound discs 41 are being pushed closed against the working piston 27 thus blocking any flow through the rebound passageways 29B. During the rebound stage, when the working piston 27 is being pushed towards the second end 22 of the inner cylinder 25, the rebound discs 41 are pushed away from the openings of the rebound passageways 29B thus increasing the force needed for the hydraulic fluid to flow through the rebound passageways 29B while the compression discs 39 are being pushed closed against the working piston 27 thus blocking any flow through the compression passageways 29A.

A valve assembly 31 is positioned at the first end 20 of the inner cylinder 25. The valve assembly 31 includes a base valve 35 and a stationary piston 37. The base valve 35 is provided to adjust the volume of hydraulic fluid in the chambers 26 and 28 to compensate for the volume of the working rod 30 entering and exiting the inner cylinder 25. As the working rod 30 enters chamber 28, hydraulic fluid must be removed from the inner cylinder 25 in order to compensate for the volume occupied by the working rod 30 and the corresponding reduction of volume available for the hydraulic fluid. The base valve 35 includes regulated passageways (FIGS. 3 and 4) which allow ingress and egress of fluid between the chamber 26 of the inner cylinder 25 and the outer fluid chamber 24 as the working piston 27 moves inwardly or outwardly.

Adjacent and in contact with the base valve 35 is the stationary piston 37 also including regulated passageways (FIGS. 3 and 4) and a choking member 43 facing the working piston 27. The choking member 43 is in the form of a circular plate which is described in details further down. A coil spring 45 is loosely positioned between the working piston 27 and the choking member 43 of the stationary piston 37. The coil spring 45 is designed to mechanically join the working piston 27 and the choking member 43 of the stationary piston 37 when the working piston reaches a specific point of its stroke corresponding approximately to a distance from the stationary piston 37 equal to the length of the coil spring 45.

The inside diameter of the coils is close to the inside diameter of the inner cylinder 25 in order to maintain the coil spring 45 aligned with the choking member 43 of the stationary piston 37 and the central portion of the working piston 27 and to prevent the coil spring 45 from tilting inside the inner cylinder 25.

Figure 3:
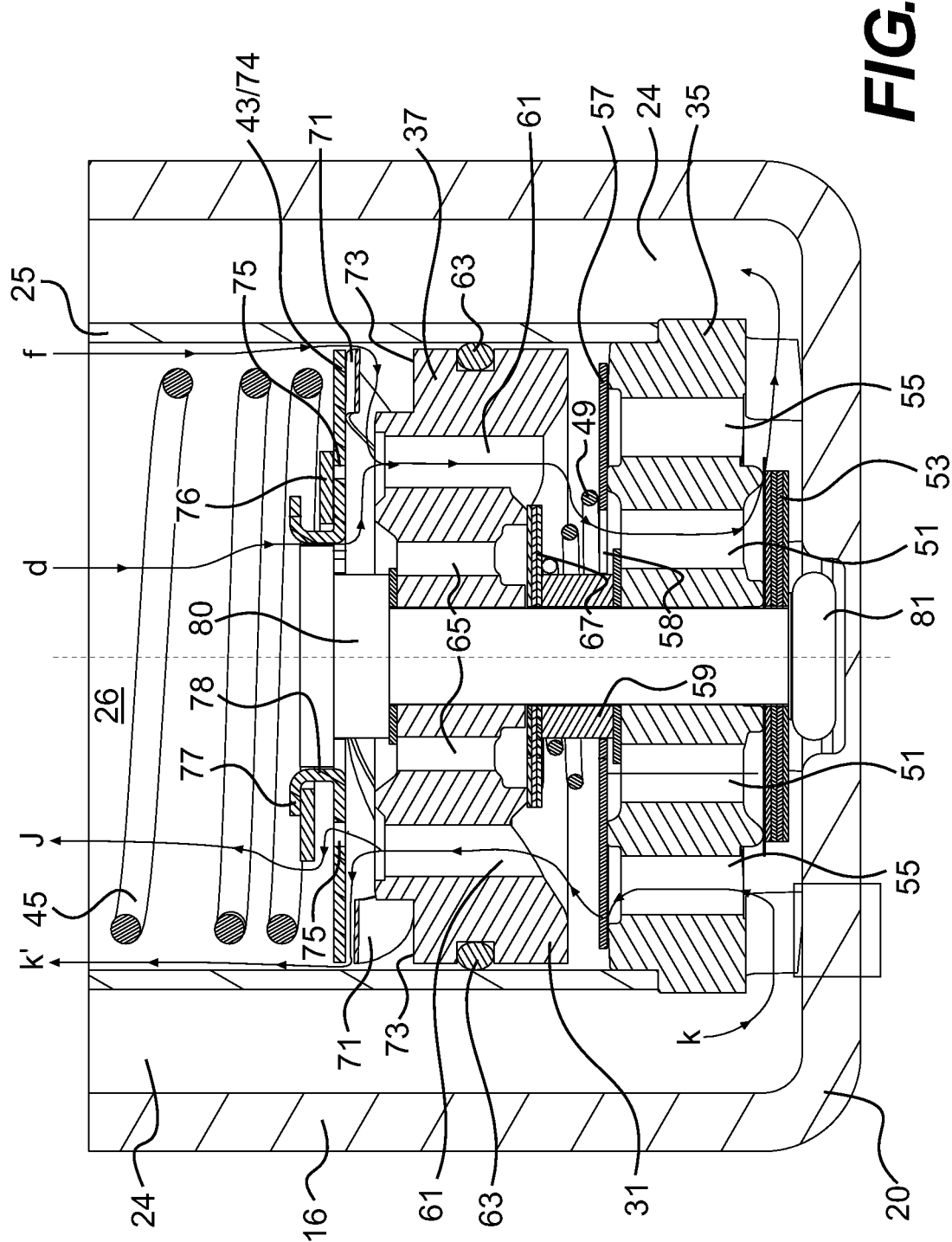
FIG. 3 is an enlarged cross-sectional view of one end of the position-sensitive shock absorber of FIG. 1 in isolation when the working piston is in the first location.

FIGS. 1 and 3 illustrate the working piston 27 approximately midway through its compression stroke as depicted by arrow C wherein hydraulic fluid is passing through the compression passageways 29A which are restricted by the compression discs 39. Fluid also passes around choking member 43 and flows unrestricted through passageways 61 of the stationary piston 37 and through the base valve 35 to compensate for the volume occupied by working rod 30 entering chamber 28. The damping characteristics of the shock absorber 15 in the first segment of the compression stroke of the working piston 27 i.e. before the working piston 27 makes contact with spring 45, are defined by the size and number of compression passageways 29A in the working piston 27 and by the size and number of passageways in the base valve 35, and by the yield strength of their respective compression discs (39 and 53). It should be understood that the stationary piston 37 does not effect the compression damping in the first segment of the compression stroke of the working piston 27 since by-pass passageways 61 are open and unrestricted.

Figure 2:
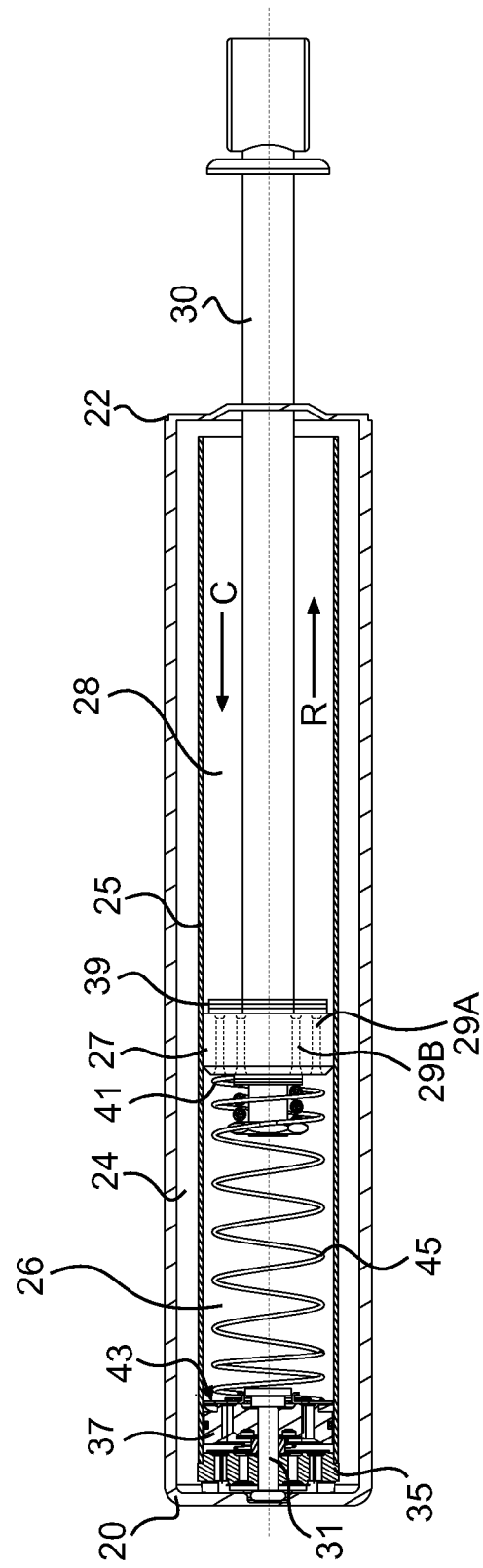
FIG. 2 is a cross-sectional view of the position-sensitive shock absorber of FIG. 1 with the working piston in a second location.
Figure 4:
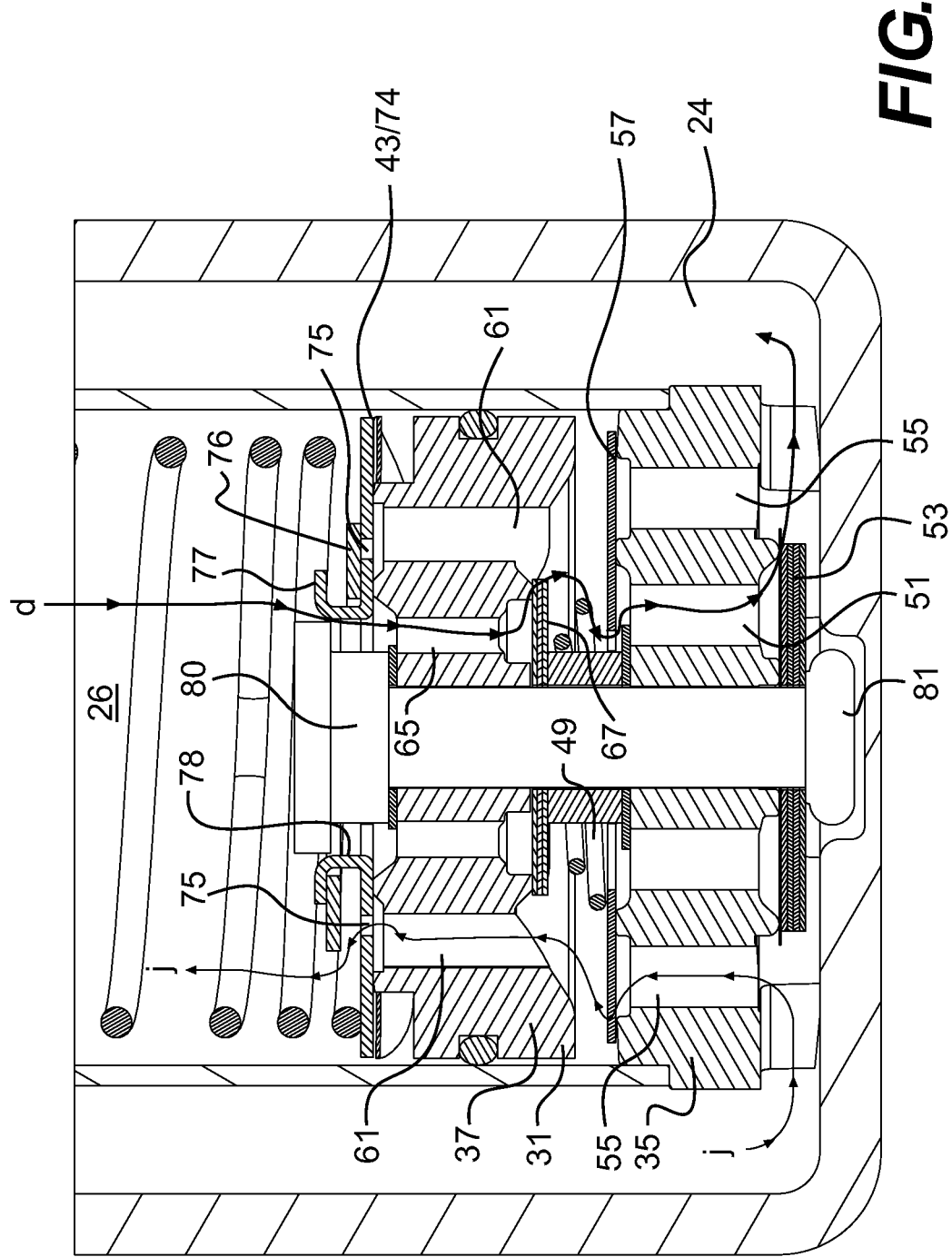
FIG. 4 is an enlarged cross-sectional view of one end of the position-sensitive shock absorber of FIG. 1 in isolation when the working piston is in the second location.

With reference to FIGS. 2 and 4, which illustrate the working piston 27 approximately two thirds of the way through its compression stroke as depicted by arrow C, the coil spring 45 is in contact with the working piston 27 at one end and with the choking member 43 at the other end. As best seen in FIG. 4, under the pressure of the coil spring 45, the choking member 43 is pressed against the stationary piston 37 covering at least partially, if not fully, the passageways 61 of the stationary piston 37 forcing the fluid through passageways 65 and over compression discs 67 thereby increasing the resistance to the flow of hydraulic fluid and altering the compression damping of the shock absorber 15.

The shock absorber 15 therefore has two distinct damping characteristics through its compression stroke dependant on the position of the working piston 27 in the inner cylinder 25: A first compression damping from the beginning of the compression stroke to the point where the choking member 43 is pressed against the stationary piston 37 by the coil spring 45 and a second compression damping from the point where the choking member 43 is pressed against the stationary piston 37 by the coil spring 45 to the end of the compression stroke of the working piston 27.

With reference to FIG. 3, which illustrates the first end 20 of the shock absorber 15 in isolation at the moment when the working piston 27 is in the first segment of its stroke, with the coil spring 45 not yet in contact with the working piston 27 and the choking member 43. The right hand side of FIG. 3 illustrates the choking member 43, stationary piston 37 and base valve 35 during the compression stroke whereas the left hand side of FIG. 3 illustrates the choking member 43, stationary piston 37 and base valve 35 during the rebound stroke. Base valve 35 includes a series of compression passageways 51 which are restricted by a series of compression discs 53 that define one-way valves which require a certain pressure to let the hydraulic fluid escape the first chamber 26 of the inner cylinder 25 into the outer fluid chamber 24. The base valve 35 also includes a series of rebound passageways 55 which are restricted by one or more rebound discs 57 maintained in contact with the base valve 35 by a short spring 49. The rebound discs 57 act as a one-way valve to prevent the flow of hydraulic fluid, being pushed by the working piston 27 during the compression stroke, from entering the rebound passageways 55 and by-passing the compression passageways 51. The rebound disc(s) 57 includes a central toothed aperture 58 (FIG. 5) that provides passages into the compression passageways 51 for the hydraulic fluid.

The stationary piston 37 is positioned above the base valve 35 and is maintained separate from the base valve 35 by a spacer 59 and is sealed against the inner cylinder 25 by a circular gasket 63. The stationary piston 37 includes a series of by-pass passageways 61 in which the hydraulic fluid may circulate in both directions and a series of compression passageways 65 restricted by compression discs 67.

The choking member 43 is positioned directly above the stationary piston 37 and maintained at a short distance from the stationary piston 37 by a spring washer 71 abutting against a shoulder 73 of the stationary piston 37 and against the side of the choking member 43 facing the stationary piston 37. The choking member 43 consists of a first disc 74 having a series of small apertures 75 and central inward folds 77 (best seen in FIG. 5) which holds a secondary disc 76 aligned with the apertures 75 of the first disc 74.

In operation, when the working piston 27 is in the first segment of its compression stroke, and the hydraulic fluid is pushed towards the first end 20 of the cylinder 16, the hydraulic fluid goes around the choking member 43, as depicted by the arrowed paths "d" and "f" to enter the by-pass passageways 61 of the stationary piston 37. For sake of simplicity, paths "d" and "f" are illustrated only on the right hand side of FIG. 3. The hydraulic fluid follows the path of least resistance and does not flow through the compression passageways 65 which exits are restricted by the compression discs 67. The flow of hydraulic fluid passes through the central aperture 58 of the rebound disc 57 to enter the compression passageways 51 of the base valve 35. The compression discs 53 are opened by the pressure exerted by the hydraulic fluid and the hydraulic fluid enters outer fluid chamber 24.

As illustrated in FIG. 4, when the working piston 27 enters the second segment of its compression stroke, the coil spring 45 abuts against the choking member 43 and the working piston 27, pressing the first disc 74 of the choking member 43 against the entrance of the by-pass passageways 61 of the stationary piston 37 thereby blocking passageways 61. The hydraulic pressure also presses the second disc 76 against the first disc 74 thereby blocking the small apertures 75 of the first disc 74. The only path remaining for the hydraulic fluid is the space between the first disc 74 and the holder 80 connected to the central post 81, which is the first portion of path "d". Since the entrance of the by-pass passageway 61 is blocked by the choking member 43, the hydraulic fluid must flow through the compression passageways 65 of the stationary piston 37 and force open the compression discs 67 restricting the exit of the compression passageways 65. The hydraulic fluid then flows through the compression passageways 51 of the base valve 35 and passes through the compression discs 53 to enter the outer fluid chamber 24 as previously described.

The damping characteristics of the shock absorber 15 through the second segment of the compression stroke of the working piston 27 are therefore stiffer than the damping characteristics through the first segment as the flow of the hydraulic fluid must go through the compression passageways 65 and overcome the compression discs 67 as well as through compression passageways 51 and overcome the compression discs 53.

When the working piston 27 retracts towards the second end 22 as depicted by Arrow "R" in FIGS. 1 and 2, the shock absorber 15 is said to be in its rebound mode. In the rebound mode, the working rod 30 is moving out of the inner cylinder 25 and hydraulic fluid re-enters the inner cylinder 25 from the outer fluid chamber 24 through the base valve 35 and the stationary piston 37.

With reference to FIGS. 2 and 4, when the working piston 27 is retracting and still in the second segment of its stroke (choking member 43 still pressed against the stationary piston 37), hydraulic fluid enters the rebound passageways 55 of the base valve 35 from the outer fluid chamber 24 as depicted with arrowed path "J". The hydraulic fluid overcomes the force of rebound disc 57 and exits the rebound passageways 55. The hydraulic fluid passes through the by-pass passageway 61 to reach the choking member 43 which is still blocking the orifice of the by-pass passageway 61. The first disc 74 of the choking member 43 is maintained against the stationary piston 37 by the force of the spring 45, however the apertures 75 of the first disc 74 allow the hydraulic fluid to easily push away the secondary disc 76 and pass through the apertures 75, which is illustrated open on the left hand side of FIG. 4, and exit the by-pass passageway 61 of the stationary piston 37 to enter the first chamber 26 of the inner cylinder 25. It should be understood that since there is no spring acting on secondary disc 76, it will not prevent the fluid from passing through the apertures 75 when in the rebound mode and that the fluid pressure itself will push it away from apertures 75 with little effect on the fluid flow.

Figure 5:
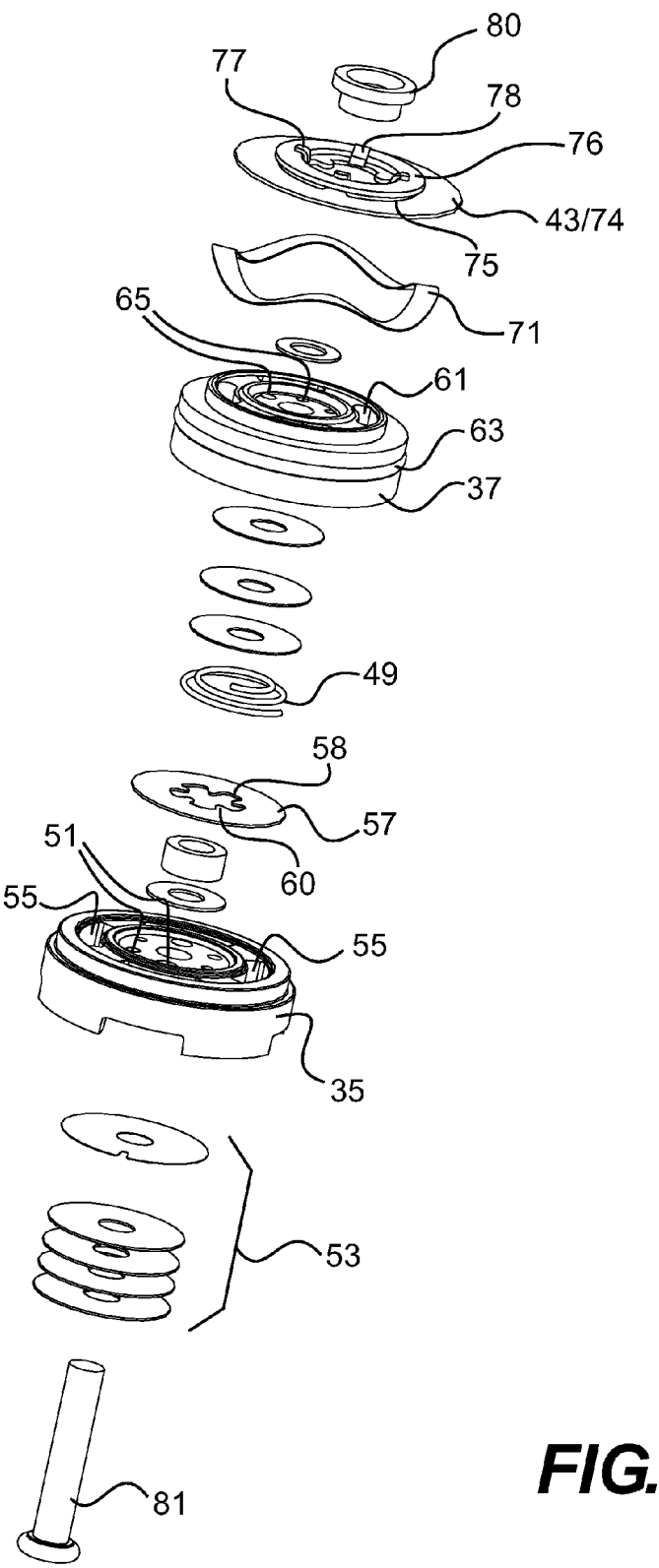
FIG. 5 is a perspective exploded view of a base valve and a stationary piston shown located in the isolated end of the position-sensitive shock absorber in FIGS. 3 and 4.

With reference to FIGS. 1 and 3, when the working piston 27 is retracting and enters the first segment of its stroke (choking member 43 disengaged from the stationary piston 37), the coil spring 45 no longer applies pressure to the choking member 43 such that the first disc 74 is pushed upward by the spring washer 71 thereby opening the orifice of the by-pass passageway 61 of the stationary piston 37 allowing the fluid to flow around the first disc 74 such as paths "K" and "K" and also through apertures 75 following path "J". As best seen in FIG. 5, apertures 75 are elongated and provide ample space for the hydraulic fluid to flow through the choking member 43. As well there are gaps 78 surrounding the inward folds 77 which provide additional space for the hydraulic fluid to flow through the choking member 43. Preferably, the rebound damping is relatively unchanged between the first segment and the second segment.

With reference to FIG. 5, which is an exploded view of the base valve 35 and stationary piston 37, it can be seen that the base valve 35 includes a series of four rebound passageways 55 spread evenly around the outer portion of the base valve 35 and a series of six compression passageways 51 spread evenly around the inner portion of the base valve 35. The stationary piston 37 also includes a series of four by-pass passageways 61 spread evenly around the outer portion of the stationary piston 37 and a series of six compression passageways 65 spread evenly around the inner portion of the stationary piston 37. The central aperture 58 of the rebound discs 57 includes inwardly extending legs 60 that maintain the disc 57 centered while allowing the hydraulic fluid access to the compression passageways 51 of the base valve 35.

Figure 6:
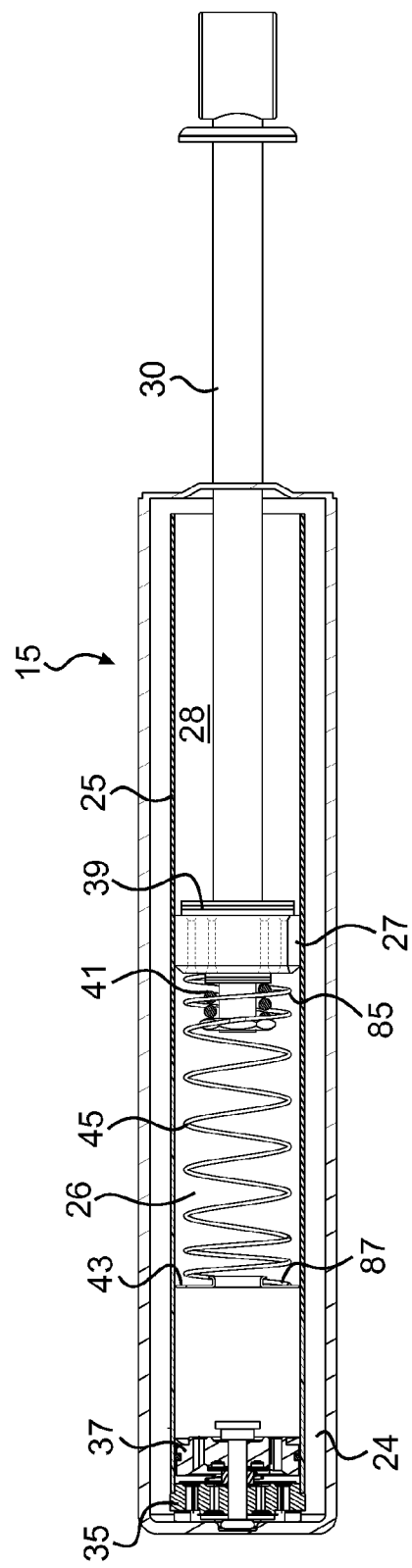
FIG. 6 is a cross-sectional view of a position-sensitive shock absorber in accordance with a second embodiment of the invention with the working piston in a first location.
Figure 7:
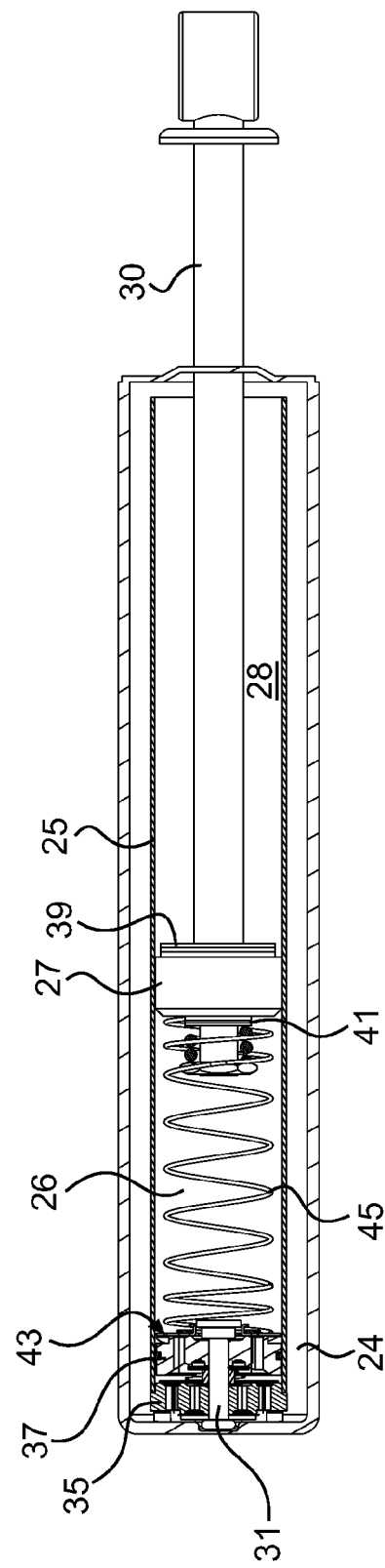
FIG. 7 is a cross-sectional view of the position-sensitive shock absorber of FIG. 6 with the working piston in a second location.

With reference to FIG. 6, which is a second embodiment of the shock absorber 15, one end 85 of the coil spring 45 is connected directly to the working piston 27 and follows the movements of the working piston 27 while the choking member 43 is connected directly to the other end 87 of the spring 45. In the first segment of the stroke of the working piston 27 wherein the choking member 43 is not in contact with the stationary piston 37, the damping characteristic of the shock absorber 15 is defined by the compression discs 39 positioned on one side of the working piston 27 and by the rebound discs 41 positioned on the other side of the working piston 27. The choking member 43 simply follows the movement of the working piston 27 and does not significantly restrict the flow of hydraulic fluid. When the working piston 27 reaches the second segment of its stroke as illustrated in FIG. 7, the choking member 43 abuts against the stationary piston 37 thereby increasing the resistance to the flow of hydraulic fluid exiting the inner cylinder 25 into the outer fluid chamber 24 in the same way as previously described relative to FIGS. 2 and 4.

In yet another embodiment (not shown), the spring 45 is connected to the working piston 27 and follows the working piston 27 while the choking member 43 is fixed to the stationary piston 37. When the working piston 27 reaches the second segment of its stroke, the spring 45 abuts against the choking member 43 which, abuts against the stationary piston 37 thereby restricting the flow of hydraulic fluid through the stationary piston 37 and increasing the resistance to the flow of hydraulic fluid.

Adjustment of the specific point where the working piston 27 engages the choking member 43 may be effected by altering the length of the spring 45. A simple replacement of the spring 45 will alter the point along the stroke of the working piston 27 where the choking member 43 is pressed against the stationary piston 37 with the effect of adjusting the position of the point of transition between the two levels of damping of the shock absorber 15.

Figure 8:
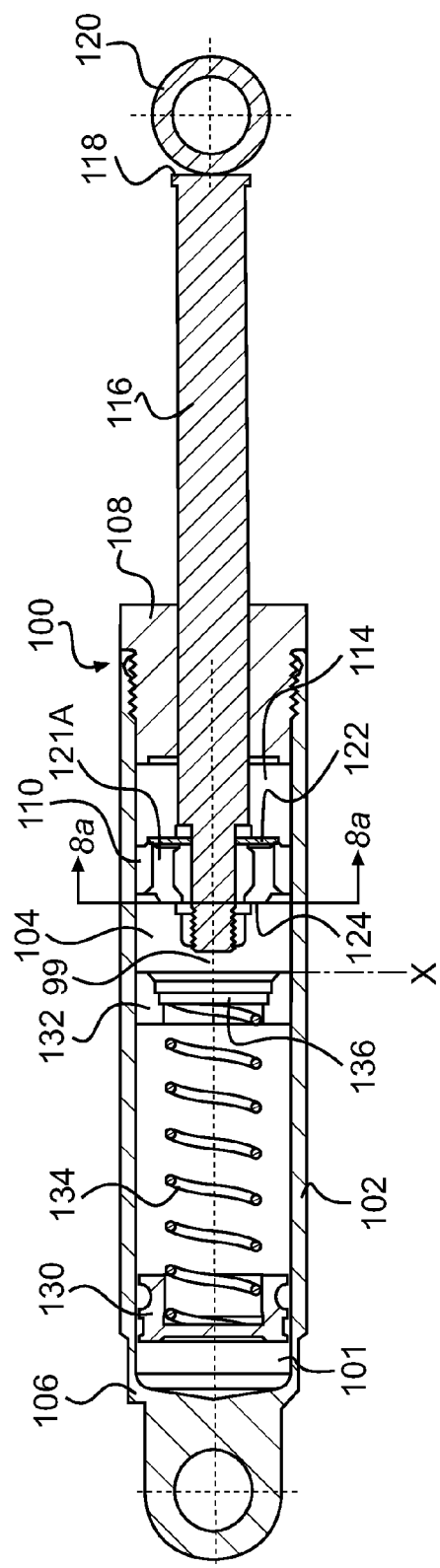
FIG. 8 is a cross-sectional view of a position-sensitive shock absorber in accordance with a third embodiment of the invention with the working piston in a first location.

Referring now to FIG. 8, which illustrates a third embodiment of the invention, there is shown a position-sensitive shock absorber 100 including a cylinder 102, a first end 106 and a second end 108, which together define a housing 104. A working piston 110 is movably mounted within the housing 104 for movement between the first and second ends 106, 108 of the cylinder 102. The working piston 110 divides the housing 104 into a first chamber 112 and a second chamber 114. The working piston 110 is connected to a working rod 116 extending outside the cylinder 102. The end 118 of the working rod 116 typically includes a fastener 120 adapted for connection to a moving part (not shown).

The working piston 110 includes several passageways 121A and 121B there through that fluidly connect chambers 112 and 114. One or more compression discs 122 are positioned on one side of the working piston 110 in alignment with the compression passageways 121A and restricts the flow of hydraulic fluid when the working piston 110 is moving inwardly toward the first end 106. One or more rebound discs 124 are positioned on the other side of the working piston 110 in alignment with the rebound passageways (not shown) which restrict the flow of hydraulic fluid when the working piston 110 is moving outwardly toward the second end 108. The compression discs 122 and the rebound discs 124 are placed on each side of the piston to provide the necessary resistance to the hydraulic fluid when the working piston 110 moves to effect damping of the movement. The discs consist of circular disc or discs that cover the entrance of the rebound and compression passageways to restrict and/or prevent the flow of hydraulic fluid through the passageways in one direction (compression) or the other direction (rebound). In a preferred configuration, the compression passageways are positioned along the outer circumference of the working piston 110 whereas the rebound passageways are positioned near and around the central axis 99 of the working piston 110 similar to the working piston 27 of the first embodiment illustrated in FIGS. 1 to 5.

A floating piston 130 separates and seals the hydraulic fluid from a gas chamber 101. The gas within the gas chamber 101 is compressible and provides a buffer zone by increasing or decreasing the volume of chambers 112, 114 to compensate for the working rod 116 entering and exiting chamber 114. When the working rod 116 enters cylinder 102, the volume of the working rod 116 must be compensated for since the cylinder 102 does not expand and the volume of the fluid does not decrease nor can it be compressed. As the working rod 116 enters chamber 114, the floating piston 130 is forced towards the end 106 to increase the volume of chambers 112 and 114, compressing the gas within the gas chamber 101 and reducing the volume of the gas chamber 101. Similarly, when the working rod 116 exits chamber 114, the volume of the gas chamber 101 increases to compensate the volume of the retracting working rod 116.

A choking member 132 is mounted to the floating piston 130 via a spring 134 which holds the choking member 132 at a specific point X along the stroke of the working piston 110. This position could be any percentage of the stroke of the working piston 110 depending on the length of the spring 134. The choking member 132 is a ring-shaped member that moves within the housing 104. A large passage 136 in the middle of the choking member 132 allows the nut and washer holding the working piston 110 to the rod 116 to pass therethrough without choking the hydraulic fluid flowing through passage 136.

With reference to FIG. 8*a*, which is a cross sectional view of the working piston 110 taken at line 8*a*-8*a* of FIG. 8 when the choking member 132 is not in contact with the working piston 110. The rebound disc 124 is centrally located leaving the entry of the compression passageways 121A free for the hydraulic fluid to flow into passageways 121A in the first segment of the compression stroke of the working piston 110. FIG. 8*a* illustrates the surface area of the entry of the compression passageways 121A unrestricted and unobstructed. It is to be understood that the compression disc(s) 122 remain in place and restrict the flow of hydraulic fluid exiting passageways 121A during the compression stroke.

With reference to FIG. 9, when the working piston 110 moved into contact with the choking member 132 at the position X, the choking member 132 now partially blocks the entrance to the compression passageways 121A thereby further restricting the flow of hydraulic fluid through the working piston 110 and altering the damping characteristic of the compression stroke beyond the position X. As is readily known in the art, reducing the surface area of a passageway in a piston, requires more force to be applied to the reduced-passage piston for it to continue at a specific speed when compared to a non-reduced-passage piston. Therefore, once the blocking member makes contact with the working piston, reducing the surface area of the entrance to passageways 121A, the speed of the working piston will decrease and/or require more force to continue at the same speed, effectively increasing the compression damping.

With reference to FIG. 9*b*, which is an enlarged view of the encircled portion of FIG. 9, when the choking member 132 is engaged with the working piston 110, the outer rim 180 of the choking member 132 abuts against the outer periphery of the working piston 110 covering a portion of the compression passageways 121A and the chamfer 182 of the choking member 132 further restricts the entrance of the compression passageways 121A leaving a small area 185 between the rebound disc 124 and the chamfer 182 of the choking member 132 for the hydraulic fluid to flow as depicted by arrow path "M".

Figure 9A:
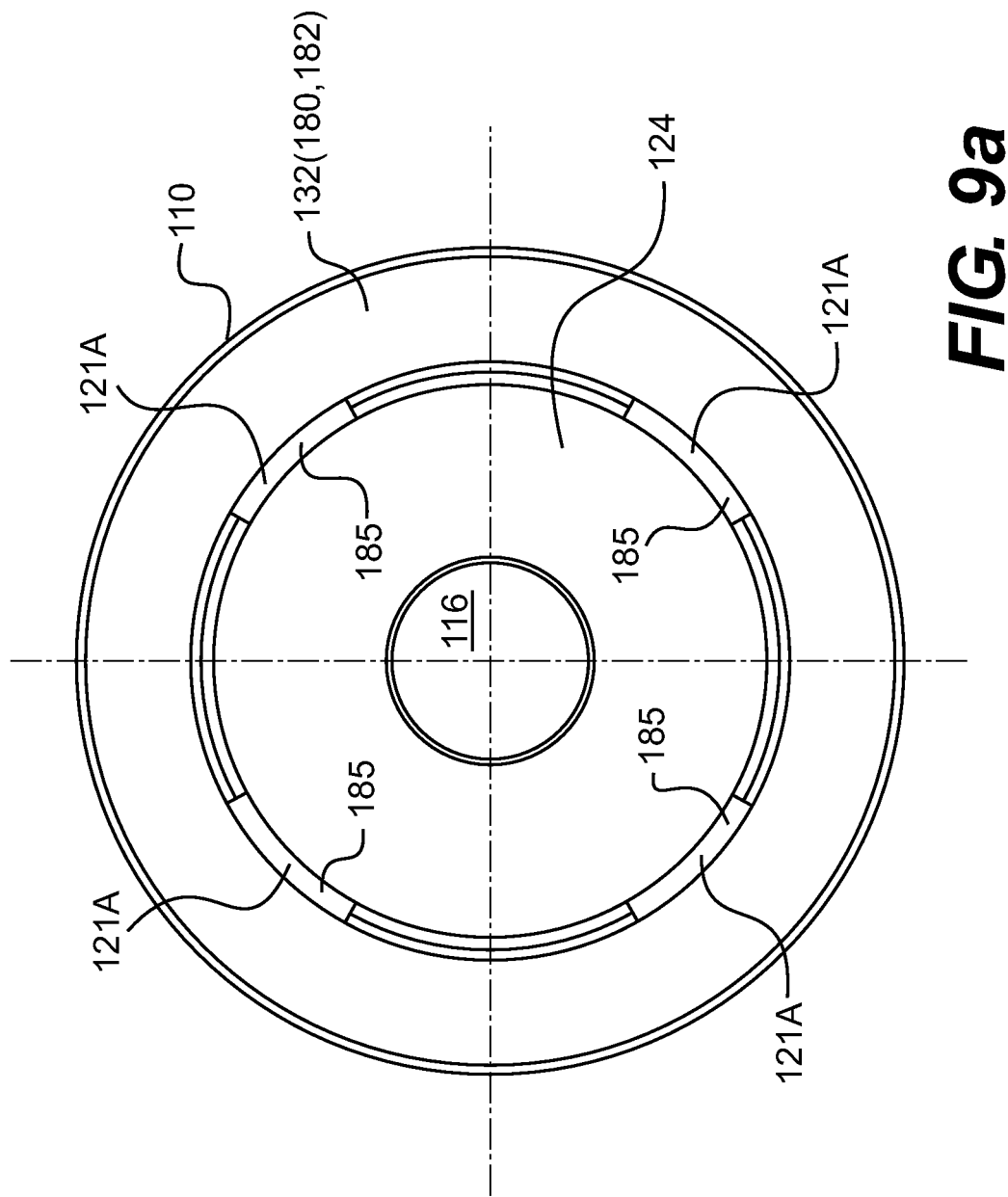
FIG. 9a is cross-sectional view of the position-sensitive shock absorber taken at line 8a-8a in FIG. 9.

With reference to FIG. 9*a*, which is a cross sectional view of the working piston 110 taken at line 9*a*-9*a* of FIG. 9 when the choking member 132 is in contact with the working piston 110. The rebound disc 124 is centrally located as previously mentioned relative to FIG. 8*a*. The outer rim 180 and the chamfer 182 of the choking member 132 cover a large portion of the entrance to compression passageways 121A leaving a smaller surface area 185 for the hydraulic fluid to flow than as illustrated in FIG. 8*a* and therefore restricting the flow of hydraulic fluid through the second segment of the stroke of the piston 110.

The choking member 132 is designed to modify the damping characteristics of the shock absorber 100 through its compression stroke thereby providing two levels of damping: a first level before the working piston 110 reaches the specific point X prior to engaging the choking member 132 and a second level when and after the working piston 110 reaches the specific point X along the compression stroke. The choking member 132 is designed to leave the rebound passageways free when engaged to the working piston 110 such that the flow of hydraulic fluid through the working piston 110 remains unaltered during the rebound stroke i.e. working piston 110 moving towards the second end 108 of the housing 104, thereby leaving the damping characteristics of the shock absorber 100 almost unaltered through the rebound stroke; before and after engagement to the choking member 132.

It is to be understood that in all embodiments, the spring or biasing member 134, 45 are simply to position the choking member 132 and/or 43 and to engage the working piston and the choking member at a desired position along the stroke of the working piston. The spring is preferably a very low constant spring so its effect on the rebound and compression damping are limited and controlled as desired.

Figure 10:
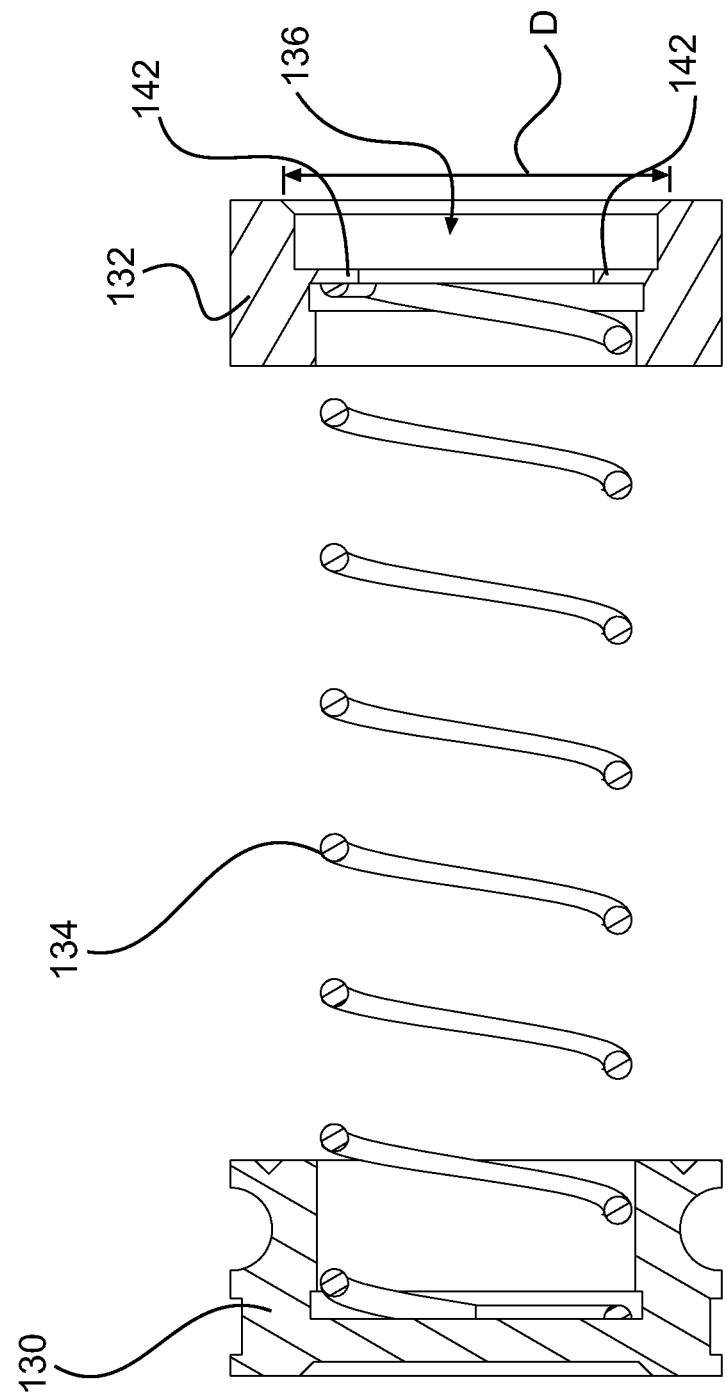
FIG. 10 is an enlarged cross-sectional view of a choking member included in the position-sensitive shock absorber of FIG. 8.
Figure 10B:
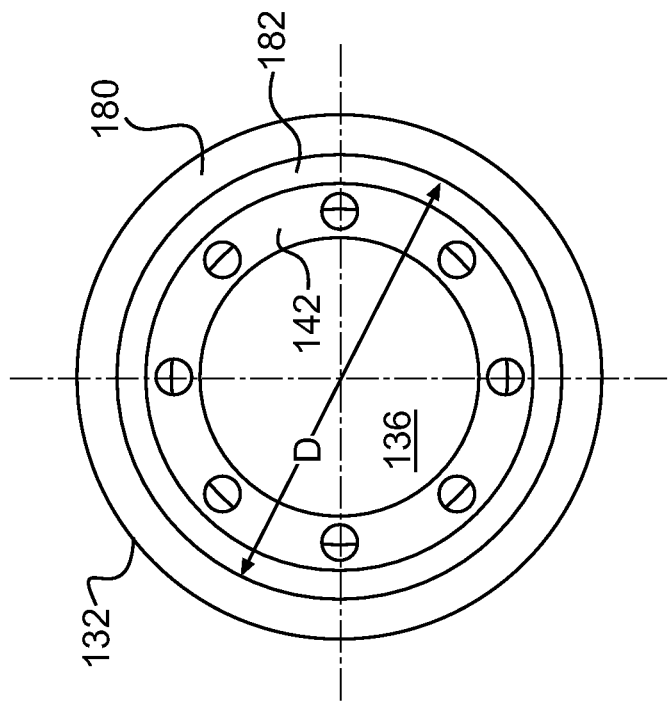
Figure 10A:
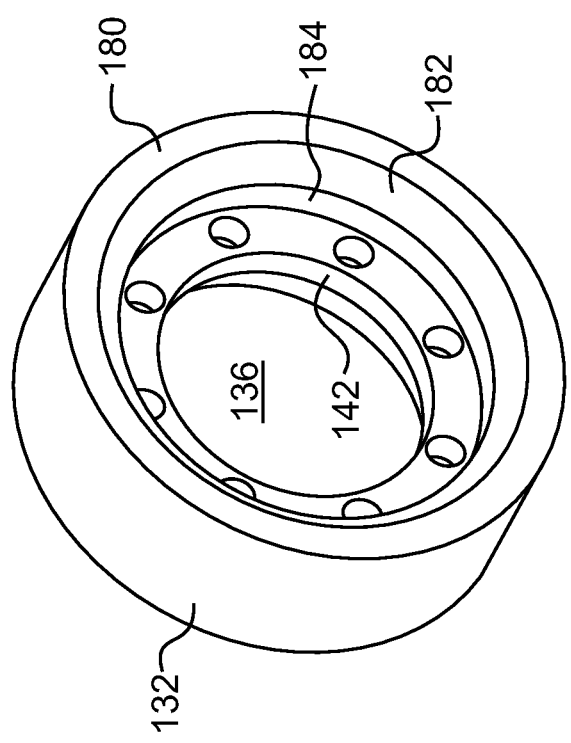
FIG. 10a is a front plan view of the choking member shown in FIG. 10.

The choking member 132 may have different internal diameters D and chamfers to increase or decrease the amount compression passageways 121A are choked upon contact with working piston 110. As should be understood, using a choking member with a small diameter D, means the compression passageways would be choked more than if a choking member with a large diameter D is used. With reference to FIG. 10, the choking member 132 includes an inward flange 142 to support spring 134 thereupon. Referring back to FIG. 9, the hydraulic fluid must flow around the flange 142 prior to entering the compression passageways 121A as indicated by the path "M". With reference to FIG. 10*a*, which is a perspective view of the choking member 132 in isolation and FIG. 10*b* which is a plan view of the choking member 132, the choking member 132 is ring-shaped body which includes a central passage 136, an outer rim 180, an interior portion 184 and a chamfer 182 linking the outer rim 180 to the interior portion 184. The choking member 132 also includes an inward flange 142 stemming from the interior portion 184 of the support spring 134, the inward flange 142 defining the central passage 136. The diameter "D" is illustrated in FIG. 10b and is defined by the widest portion of the chamfer 182.

Adjustment of the damping characteristics of the shock absorber 100 beyond the position X, for various applications, may be effected by simply replacing choking member 132 with another choking member having a different internal diameter D and/or a chamfer 182 with a different angle. As would be known by a person skilled in the art, the damping characteristics before and after the position X can also be modified by altering the compression and rebound discs 122 and 124.

Adjustment of the specific point X where the working piston 110 engages the choking member 132 may be effected by altering the length of the spring 134. A simple replacement of the spring 134 will alter the point X along the stroke of the working piston 110 where the working piston 110 engages the choking member 132 with the effect of adjusting the position of the point of transition between the two levels of compression damping of the shock absorber 100.

Figure 11:
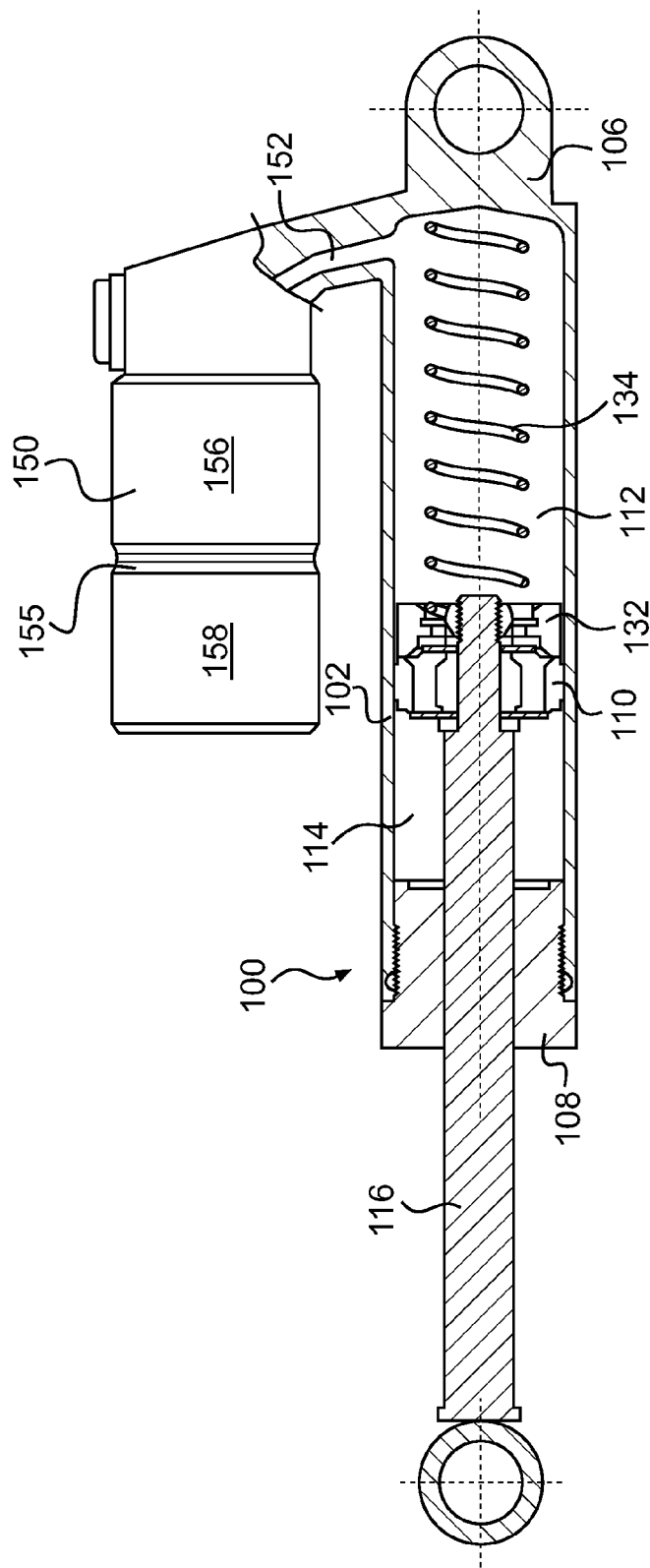
FIG. 11 is a cross-sectional view of a position-sensitive shock absorber in accordance with a fourth embodiment of the invention.

FIG. 11 illustrates a fourth embodiment of the shock absorber 100 in which a piggy-back gas/fluid chamber 150 is connected to the bottom of the first chamber 112 of the housing 104 via a channel 152. The chamber 150 includes a floating piston 155, similar to the floating piston 130 (FIGS. 8, 9 and 10) that separates a liquid fluid chamber 156 from a gas chamber 158 and functions in the same manner as the floating piston 130. The gas within the gas chamber 158 is compressible and provides a buffer zone a buffer zone to accommodate the hydraulic fluid under pressure exiting the chamber 112. When the working rod 116 enters chamber 114, the volume of the working rod 116 must be compensated by removing the equivalent volume of hydraulic fluid from the chamber 112. Hydraulic fluid is therefore pushed through the channel 152 into the liquid fluid chamber 156 and expanding the volume of the liquid fluid chamber 156 by pushing on the floating piston 155 to compresses the gas in the gas chamber 158 and reduce the volume of the gas chamber 158. Similarly, when the working rod 116 exits chamber 114, the volume of the working rod 116 must be compensated by re-introducing the equivalent volume of hydraulic fluid from the liquid fluid chamber 156. Including a piggy-back gas/fluid chamber 150 decreases the overall length and may help package the shock absorber for positioning in tight areas on a vehicle.

As previously described with reference to FIG. 8, the floating piston 130 separates and seals the hydraulic fluid from the gas chamber 150. The gas within the gas chamber 150 is compressible and provides a buffer zone by increasing or deceasing the volume of chambers 112, 114 to compensate for the working rod 116 entering and exiting chamber 114. The use of a piggy-back gas chamber 150 connected to one side of the cylinder 102 decreases the overall length of the shock absorber 100 and may help package the shock absorber in tight areas on the vehicle.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A position-sensitive shock absorber comprising:
   a cylinder having an interior, a first end and a second end, together defining a housing;
   a working piston movably mounted within the housing for movement between the first end and the second end defining the stroke of the working piston, the working piston having a first side facing the first end of the cylinder and a second side facing the second end of the cylinder, at least two fluid passageways extending through the working piston and permitting fluid flow between the first side and the second side;
   at least one compression-mode valve disposed on the second side of the working piston and at least one rebound-mode valve disposed on the first side of the working piston, the at least one compression-mode valve and the at least one rebound mode valve covering at least partially the fluid passageways of the working piston and restricting the flow of fluid through the working piston, the fluid passageways, the at least one compression-mode valve and the at least one rebound-mode valve together defining at least in part a first damping characteristic of the shock absorber; and
   a choking member moveably positioned within the housing, the choking member defining an aperture, the aperture of the choking member being a passage disposed in the middle of the choking member, the choking member has a rim portion defined by the passage of the choking member,
   when the working piston reaches a specific point along the stroke of the working piston, the choking member cooperates with the working piston to further restrict the flow of fluid by having the rim portion of the choking member abutting the working piston to cover a portion of at least one of the at least two fluid passageways thereby defining a second damping characteristic of the shock absorber from the specific point of the stroke of the working piston to the first end of the cylinder, the shock absorber having the first damping characteristic from the second end of the cylinder to the specific point of the stroke of the working piston, the second damping characteristic being different from the first damping characteristic, an entrance of the at least one of the at least two fluid passageways being defined at least in part by the rim portion and a portion of the of the at least one rebound-mode valve radially between the rim portion and the portion of the at least one rebound-mode valve when the choking member abuts the working piston,
   from the specific point of the stroke of the working piston to the first end of the cylinder the fluid flows through the aperture of the choking member, through the entrance of the at least one of the at least two fluid passageways, and then through the at least one of the at least two fluid passageways.

2. The position-sensitive shock absorber as defined in claim 1, further comprising a spring positioned within the housing and abutting the choking member.

3. The position-sensitive shock absorber as defined in claim 2, wherein the spring is biasing the choking member against the working piston when the working piston reaches the specific point along its stroke.

4. The position-sensitive shock absorber as defined in claim 3, wherein the choking member is positioned at the specific point along the stroke of the working piston.

5. The position-sensitive shock absorber as defined in claim 4, wherein the choking member includes a plurality of chokers disposed at intervals between the specific point along the stroke of the working piston and the first end of the cylinder, each choker further restricting the flow of fluid and further modifying the damping characteristic of the shock absorber as the working piston reaches each choker.

6. The position-sensitive shock absorber as defined in claim 5, wherein the chokers are mounted to different coils of the spring in a spaced apart manner.

7. The position-sensitive shock absorber as defined in claim 1, wherein when the choking member abuts the working piston the at least one rebound-mode valve is disposed in the aperture of the choking member.

8. The position-sensitive shock absorber as defined in claim 1, further comprising:
a working rod connected to the working piston, extending through the second end of the cylinder, and extending through the working piston; and
a nut fastening the working rod to the working piston.

9. The position-sensitive shock absorber as defined in claim 8, wherein when the choking member abuts the working piston, the nut is disposed at least in part in the aperture of the choking member.

10. The position-sensitive shock absorber as defined in claim 8, wherein the at least one rebound-mode valve is held between the nut and the first side of the working piston.

11. A position-sensitive shock absorber comprising:
a cylinder having an interior, a first end and a second end, together defining a housing;
a working piston movably mounted within the housing for movement between the first end and the second end, the movement of the working piston defining the stroke of the working piston, the working piston having a first side facing the first end of the cylinder and a second side facing the second end of the cylinder, compression passageways and rebound passageways, the compression and rebound passageways extending through the working piston and permitting fluid flow between the first side and the second side;
at least one compression-mode valve disposed on the second side of the working piston and covering at least partially the compression passageways and defining at least in part a first compression damping characteristic of the position-sensitive shock absorber, and at least one rebound-mode valve disposed on the first side of the working piston and covering at least partially the rebound passageways and defining at least in part a rebound damping characteristic of the position-sensitive shock absorber; and
a choking member positioned within the housing at a specific point along the stroke of the working piston, the choking member defining an aperture, the aperture of the choking member being a passage disposed in the middle of the choking member, the choking member having a rim portion defined by the passage of the choking member, the choking member engaging the working piston and restricting the flow of fluid through at least one compression passageway of the working piston by having the rim portion of the choking member abutting the working piston to cover a portion of the at least one compression passageway when the working piston reaches the specific point thereby defining a second compression damping characteristic of the position-sensitive shock absorber from the specific point along the stroke of the working piston to the first end of the cylinder, the shock absorber having the first compression damping characteristic from the second end of the cylinder to the specific point, the second damping characteristic being different from the first damping characteristic, an entrance of the at least one compression passageway being defined at least in part by the rim portion and a portion of the at least one rebound-mode valve radially between the rim portion and the portion of the at least one rebound-mode valve when the choking member abuts the working piston,
from the specific point of the stroke of the working piston to the first end of the cylinder the fluid flows through the aperture of the choking member, through the entrance of the at least one compression passageway, and then through the at least one compression passageway.

12. The position-sensitive shock absorber as defined in claim 11, wherein when the choking member abuts the working piston the at least one rebound-mode valve is disposed in the aperture of the choking member.

13. The position-sensitive shock absorber as defined in claim 11, further comprising:
a working rod connected to the working piston, extending through the second end of the cylinder, and extending through the working piston; and
a nut fastening the working rod to the working piston.

14. The position-sensitive shock absorber as defined in claim 13, wherein when the choking member abuts the working piston, the nut is disposed at least in part in the aperture of the choking member.

15. The position-sensitive shock absorber as defined in claim 13, wherein the at least one rebound-mode valve is held between the nut and the first side of the working piston.

\* \* \* \* \*

UNITED STATES PATENT AND TRADEMARK OFFICE
CERTIFICATE OF CORRECTION

PATENT NO. : 8,807,299 B2
APPLICATION NO. : 12/239201
DATED : August 19, 2014
INVENTOR(S) : Pascal Gagnon et al.

It is certified that error appears in the above-identified patent and that said Letters Patent is hereby corrected as shown below:

In The Claims

Claim 1, Column 12, line 38, "a portion of the of the at least" should read -- a portion of the at least --.

Signed and Sealed this
Twentieth Day of January, 2015

Michelle K. Lee
*Deputy Director of the United States Patent and Trademark Office*